Figure 1:
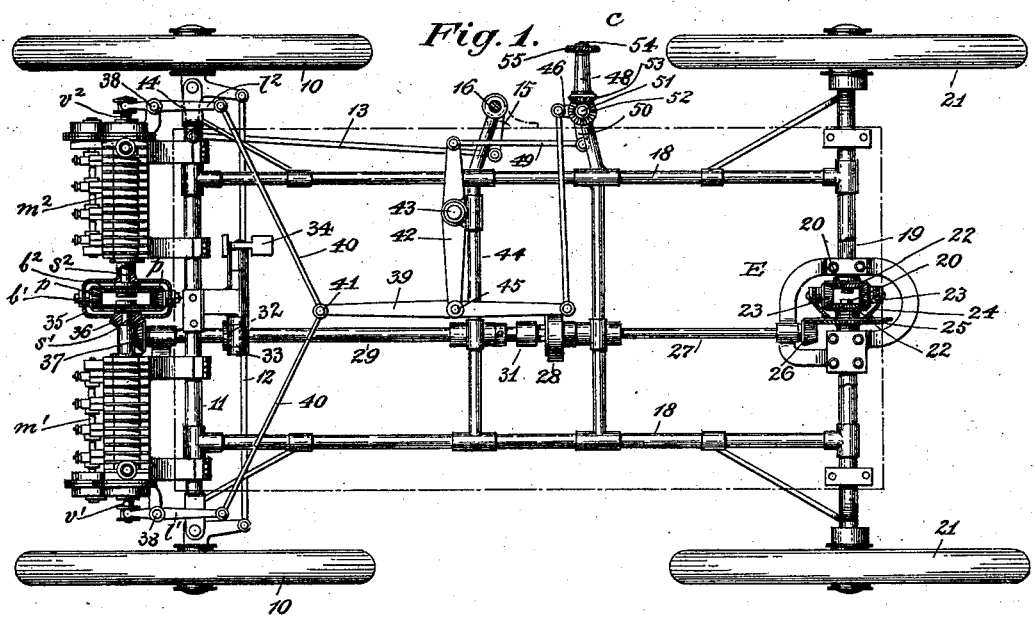

No. 695,005. Patented Mar. 11, 1902.
C. W. SPONSEL.
POWER MECHANISM.
(Application filed Nov. 11, 1901.)
(No Model.) 2 Sheets—Sheet 1.

Witnesses
Julia G. McCormick
Mae J. Daley

Inventor
C. W. Sponsel,
By his Attorney
Charles Francis Schmelz

THE NORRIS PETERS CO., PHOTO-LITHO., WASHINGTON, D. C.

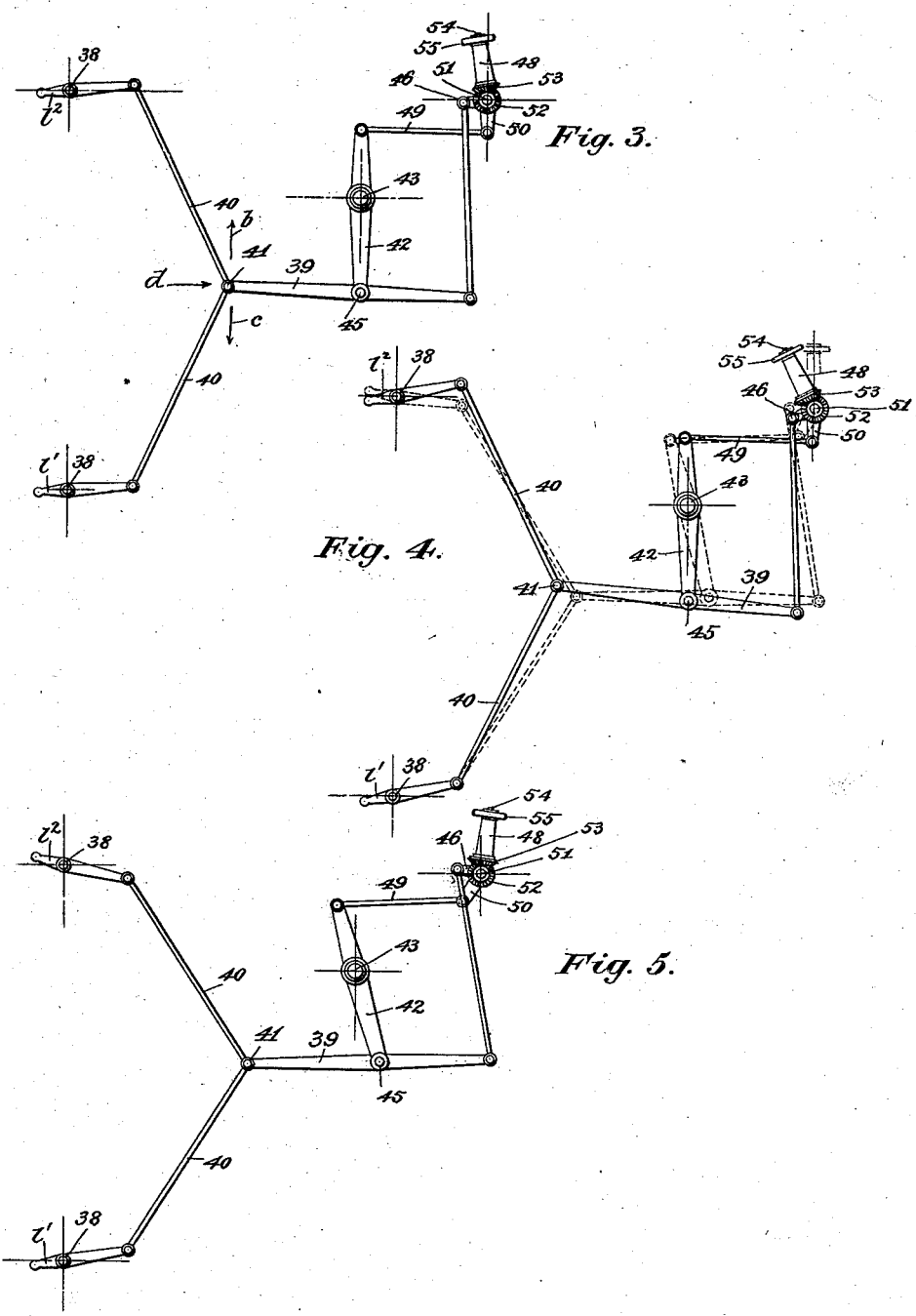

UNITED STATES PATENT OFFICE.

CHARLES W. SPONSEL, OF HARTFORD, CONNECTICUT.

POWER MECHANISM.

SPECIFICATION forming part of Letters Patent No. 695,005, dated March 11, 1902.

Application filed November 11, 1901. Serial No. 81,804. (No model.)

*To all whom it may concern:*

Be it known that I, CHARLES W. SPONSEL, a citizen of the United States, and a resident of Hartford, in the county of Hartford and State of Connecticut, have invented certain new and useful Improvements in Power Mechanism, of which the following is a full, clear, and exact specification.

This invention relates to power mechanism; and it has for one of its objects the provision of a device of this character in which a pair of motors are employed, each of these motors being primarily operative independently of the other to impart movement to a rotatory member, the speed of which may be varied without in any way altering the developed power of the motors.

Another object of my invention resides in the provision of means whereby the developed power of the motors may be varied according to the torque of a driven member or shaft without varying the speed of the latter.

My invention has, furthermore, for its object the combination and consolidation of the operating and controlling devices for the motors in such a manner that one hand of the operator will be sufficient to make the necessary adjustments and in a rational manner, thus avoiding all confusion and memorization of complicated directions, which render the operation of a device of this character by any one not familiar with the mechanical constructions and conditions a difficult undertaking.

In connection with the above my invention has, furthermore, for its object the simplification of the mechanism necessary to meet the various requirements, so that only one member need be properly positioned to obtain the desired results, this member being connected with both motor-controlling devices and so organized that the driven member will be at all times under complete control of the operator.

While it is evident that my invention may be employed in many different machines and devices for varying the developed powers of the motors and also the speed and direction of a power-transmission device, which in turn may impart a rotary motion to some other element, I have illustrated in the accompanying drawings an adaptation of my improved power mechanism to a motor-vehicle, since the requirements to be met with by this class of machines are numerous and varied and offer a good opportunity of explaining the particular purposes for which the mechanism is adapted, and in the following description I will confine myself especially to the motor-vehicle illustrated in the drawings.

Generically the organization of the mechanism is such that with a minimum-size motor I obtain a maximum amount of power by the sacrifice of speed, this power being so great that the strength of the material of which the several component parts of the mechanism are made form in reality the only limit, a limit which in the case of a motor-vehicle is also influenced by the traction of the driving-wheels on the road-bed.

The motors are in the present instance of such size as to propel the vehicle at the desired maximum speed on a level, this condition including the fact that the effecting-motor obtains the full amount of power required, while the other motor is practically non-operative. From this condition the movement of the vehicle can be graded until the vehicle is at a standstill and then may be caused to move in the opposite direction, gradually increasing in velocity until a full-speed retrograde movement has been reached.

As above stated, I employ a pair of motors operative independently of each other and moving in opposite directions, these opposite movements becoming effective on a power-transmission device which in turn may impart a rotary movement to a shaft which controls the movement of the driving-wheels of the vehicle. This transmission device is so organized that when the speeds of the oppositely-moving motors are equal the device will be at rest, while when the speed of one motor exceeds that of the other said device will be rotated in the same direction as that of the higher-speed motor, but at only one-half the speed difference between said motors. My present invention relates particularly to the control of the motors, or, in other words, to the regulation of their relative speeds one to the other, so that either motor may have a greater speed than its companion, and at the same time, according to the torque of the driven member, the motive power of either or both motors may be varied as the operator may deem proper.

In motor-vehicles one hand of the chauffeur or operator is usually employed in steering his machine, while his other hand manipulates the controlling-lever, and in the present instance this controller is so organized that when the operator wishes to advance said lever is pushed forward relatively to a neutral line, which divides the entire movement of said lever into two distinct zones for the forward and the backward movement, respectively, of the vehicle. When the controlling-lever is in alinement with the neutral line, both motors will run at equal speed and no movement of the vehicle will result; but the relative speeds of the motors are changed as soon as the lever enters either one of the two zones, the difference in the speeds being increased proportionately to the deviation of the axis of the controller from the neutral line in either direction, so that the farther forward the lever may be the faster the vehicle will move forward, and vice versa.

Assuming that the vehicle is traveling at a medium speed along a level road and that the power required for this speed is about one-half of the efficiency of the effective motor, it will be necessary in order to maintain this speed when going up a grade or hill to increase the power of the motors without affecting their speed ratio. Hence my invention includes as one of its features a device which is operable independently of, but movable with, the speed-controller, so that not only the speed developed but also the efficiency obtained by the motors will at all times be under the control of the operator.

Figure 2:
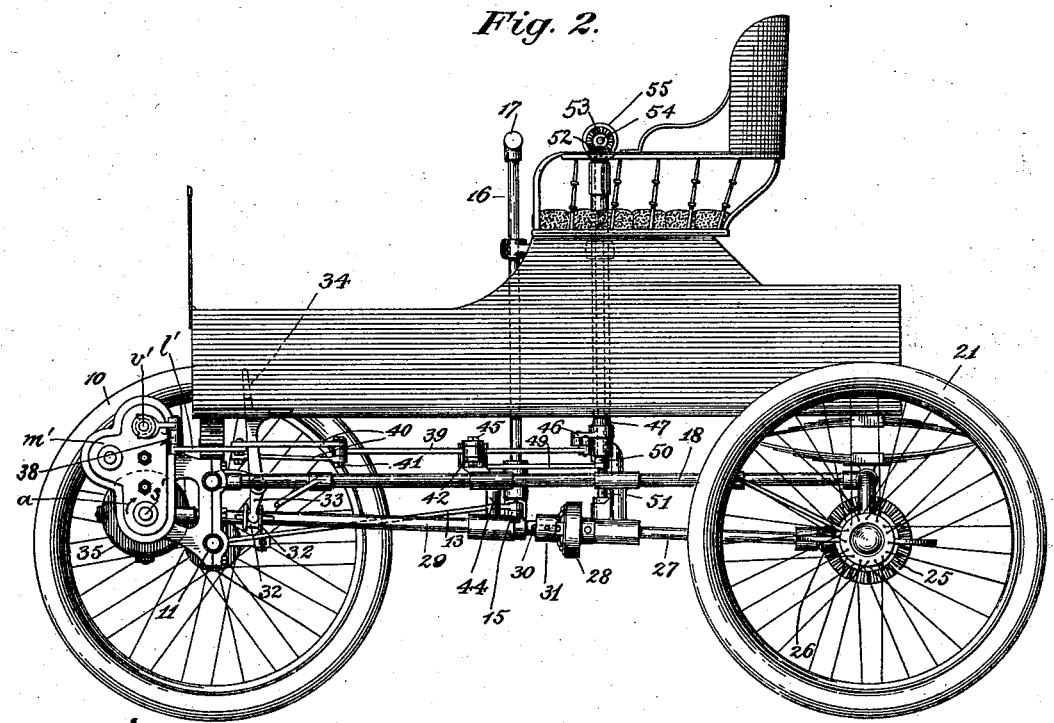

Referring to the accompanying drawings, in which similar characters denote similar parts, Figure 1 represents a top view of a motor-vehicle embodying my improvements. Fig. 2 is a side view of the vehicle, one of the front wheels having been removed and the axle being represented in section more clearly to show the operating parts. Figs. 3 to 5, inclusive, are diagrams of the operating mechanism and illustrate different positions thereof, according to the requirements of the operator—viz., Fig. 3 shows the position of the parts when the vehicle is slowly advancing under half-power. Fig. 4 illustrates in full lines the position of the operating linkage when the vehicle is going forward at a maximum rate of speed under half-power, while the dotted lines illustrate the motors operating at nearly equal speeds under half-power; and Fig. 5 shows the position of the operating linkage when the vehicle is moving slowly backward, but under full control.

Referring to the drawings, 10 10 denote the front wheels of the vehicle, pivoted on the front axle 11 in any suitable manner and connected by a link 12 to cause them to be moved at the same time and in a proper manner. The wheels may be deflected from their course by a rod 13, secured with one end to an arm 14 and with its other end to an arm 15, mounted upon a vertical shaft 16, at the upper end of which may be secured the lever 17, all of these parts being of ordinary construction.

The frame of the vehicle comprises also a pair of reaches 18, extending from the front axle 11 to a two-part axle 19, the latter being made tubular to serve as a bearing for the rear driving-shaft 20, also made in two parts and carrying the rear driving-wheels 21, both shaft-sections being united by an equalizing-gear E. This equalizing-gear comprises in the present instance a pair of bevel-gears 22, secured to the sections of the rear shaft, respectively, and actuated by one or more idlers 23, journaled in a circular casing 24, which carries a bevel-gear 25 in engagement with a bevel-pinion 26, which is secured to a longitudinally-disposed shaft 27. For the sake of convenience and also for the purposes to be hereinafter set forth, the shaft 27 comprises a pair of sections, which may be coupled by a suitable clutch, such as indicated herein by 28, and it may be operated as follows: The forward section 29 of the shaft 27 is preferably tubular to receive a rod 30, connected at its rear end to and controlling a clutch member 31, which is mounted for rotation with the shaft 29 and is movable longitudinally thereon by said rod 30. The forward end of this rod may carry a grooved collar 32, also rotating with the shaft 29 and mounted for longitudinal movement thereon, this movement being effected by an arm 33, the position of which may be controlled by a foot-lever 34, whereby the clutch may be thrown in or out and the shaft-section 27 and 29 coupled or uncoupled, as desired.

To the front axle are secured a pair of motors $m'$ $m^2$, which may be of any well-known type and which may be operated by explosive vapor, steam, or analogous power, the only condition imposed being that both motors may be grooved or regulated as required—as, for instance, by suitable valves, the stems of which are indicated herein by $v'$ $v^2$, respectively. The motors $m'$ $m^2$ are disposed on opposite sides of the longitudinal axis of the vehicle and so that their shafts will run in opposite directions.

The shaft $s'$ of the motor $m'$ carries a bevel-gear $b'$, while the shaft $s^2$ of the motor $m^2$ carries a bevel-gear $b^2$, both bevel-gears being engaged by one or more planetary pinions $p$, which are journaled in an annular casing 35, constituting a rotatory member, the movement of which may be transmitted to the shaft 29—as, for instance, by bevel-gears 36 and 37, mounted on the rotatory member 35 and the shaft 29, respectively. It will now be seen that when the rotation of the shaft $s'$ is in the direction of arrow $a$ in Fig. 2 and the rotation of the shaft $s^2$ is in the opposite direction, and that when, furthermore, the speeds of both shafts $s'$ and $s^2$ are equal, no movement of the rotatory member 35 will result, the pinions $p$ merely running idle. On the other hand, it will be understood that if the shaft $m^2$ is practically at a standstill and the shaft $s'$ is rotating the rotatory member 35 will be moved in the same direction with that of the shaft $s'$, but at only one-half the speed thereof. It will also be seen that if the shaft $s^2$ is rotating while the shaft $s'$ is practically stationary the rotating member 35 will move in the same direction with the shaft $s^2$, but only at one-half the speed of the latter.

From the foregoing it will be seen that the movement of the rotatory member 35 is controlled entirely by and dependent upon the difference in speeds at which the two motors $m'$ and $m^2$ are operated, the dividing-line between the forward and backward movement *per se* of the rotatory member 35 being that position of the valves at which both motors are operating at equal speeds, and the forward and retrograde movements of said member will depend upon the variation of the speed of one motor relative to that of the other, the rotatory member 35 following in its movement that of the predominate motor speed.

In the present instance I have shown the valves $v'$ and $v^2$ controlled by levers $l'$ and $l^2$, respectively, pivoted intermediate their ends, as at 39, and having their rear ends connected with a member 39—as, for instance, by links or rods 40—and it is particularly the point of junction 41 on the member 39, which is to be positioned according to the various requirements. In Fig. 1 the position of this point is such that both motors are running at equal speeds and under half-power, the operating-levers $l'$ and $l^2$ of the valves being substantially in parallelism at this time and so organized that as the valve-stem is shifted outwardly the motor will receive more power, and will consequently travel at a greater rate of speed, while if the valve-stem is moved inwardly less power will be imparted to the motor, and the latter will consequently run slower. With this explanation in mind it will be understood that when the point 41 is moved in the direction of the arrow $b$ the valve of the motor $m^2$ will be gradually closed, so that, therefore, the speed ratio of the two motors relative to each other will be changed and the rotatory member 35 will be caused to move in the same direction, but of course at a lower rate of speed than that of the motor $m'$, the average power supplied to the motors remaining, however, the same as before. On the other hand, if the point 41 is moved in the direction of arrow $c$ the speed ratio of the motors $m'$ and $m^2$ will be changed, inasmuch as the valve $v^2$ will admit more power to the motor $m'$, while the power of the motor $m'$ will be throttled and the average power supplied to both motors can remain the same as before. If, again, the point 41 is moved from the position shown in Fig. 1 in the direction of arrow $d$, both the operating-levers $l'$ and $l^2$ will be shifted to open both valves wider than before, but without in any way influencing the speeds, which, as has above been stated, are equal in this instance. A condition like this would be required, for instance, when the vehicle is to be brought to a complete standstill on a very steep grade, requiring a great amount of power to prevent the vehicle from rolling down hill of its own accord, and it is evident that the developed power of the motors may be proportionately less when the vehicle is to remain at rest on a smaller grade. The same condition, however, prevails when the carriage is traveling forward on a level road under half-power and at half-speed and when it should become necessary to run upgrade. If this upgrade is comparatively small little additional power need be given to the motors; but if the grade is very steep the power supplied to the motors must be proportionately greater. The same conditions prevail when the carriage is moving backward. Now again, referring to the rotatory member 35, which, as has before been stated, is controlled by the predominate speed of either motor, it is evident that any point of speed of the vehicle may be obtained between zero and the maximum travel, either forward or backward. When it is now taken into consideration that when the motor $m'$ is running at full power and the motor $m^2$ is running at nearly but not quite the same speed, and will consequently have also almost its full power, the movement of the rotatory member will be very slow in a forward direction; but the forward movement will be a very powerful one, and the difference in speeds may be so minute, if necessary, that the vehicle need not travel more than one inch in an hour as against a speed of from thirty to forty miles for the same length of time, according to the speed for which the motors have been selected.

In the foregoing paragraph I have given merely an illustration to emphasize the great difference in results which may be obtained by my improved system and which is very important in machines where only a small motor can be used and where the greatest possible power to be developed thereby is an essential feature.

The mechanism for positioning the valve-controlling member, or, more particularly speaking, the speed-controlling device, whereby the valves are positioned and the efficiency of both motors varied simultaneously, may be of any suitable construction, the member 39 being in the present instance mounted for oscillation on a lever 42, pivoted at 43 on cross-brace 44, interposed between the reaches 18, above referred to. This lever 42 is normally stationary when the speeds of the motors are to be varied without in any way affecting the average power supplied thereto, so that under these conditions the member 39 is oscillated upon a substantially fixed pivot 45, the oscillation being preferably imparted by a speed-controller $c'$, comprising an arm 46, connected with the member 39 and mounted upon a vertically-disposed tubular shaft 47, provided at its upper end with a radial projection or handle 48. The organization of this device is such that when the handle is pushed forward the motor $m'$ will receive a greater amount of power, while the power of the motor $m^2$ will be decreased. The handle 48 for varying the speed ratio of the motors relative to each other is movable in two distinct zones disposed at opposite sides of a neutral line corresponding to the position both motors are operating at equal speeds, and for the sake of simplicity in manipulation the handle or speed-controller 48 is movable in a horizontal plane, so that the hand of the operator may find a convenient resting-place thereon.

Inasmuch, as above stated, the position of the member 35 controls not only the speed, but also the power of the motors, means are provided whereby in addition to the movement laterally of the longitudinal axis of the vehicle a forward and backward movement in alinement with said axis may be imparted to said member. These means consist, substantially, of a lever 42, which is preferably of the oscillatory type and is pivoted intermediate its ends and the outer end of which may be connected—as, for instance, by a link 49—to an arm 50, secured to the lower end of a vertical shaft 51, to which an oscillatory movement may be imparted, so as to move the member 35 bodily toward and away from the motors for variably controlling the efficiency of both motors simultaneously.

Proper oscillation may be given to the shaft 51 through the intervention of a bevel-gear 52, secured thereto and engaged by another bevel-gear carried on a spindle 54, which is preferably journaled in the arm 46 and may be operated independently therefrom—as, for instance, by a hand-wheel 55—while, on the other hand, said spindle 54 is movable with said oscillatory arm 46. In this manner I obtain what may be properly termed a "compound controller," whereby not only the speed but also the efficiency of said motors simultaneously may be varied, either separately or together, as may be desired. The spindle 54 is mounted for rotation in the oscillatory lever 46 and so organized that the operator may grasp the hand-wheel 55 and control the position of the lever 46 and that of the spindle 54 at the same time. While it is apparent that the lever 46 may be pushed forward to vary the speed of the motors without imparting any rotation to the vertical shaft 51 and, furthermore, that the shaft 51 may be rotated to vary the power supplied to the motor for varying the speed, it is evident that if the relative positions of hand-wheel 55 and the lever 46 remain the same during the forward oscillation of the latter not only the speed ratio of the motors will be changed to increase the speed of the carriage, but at the same time the power supplied to the motors will be decreased, and vice versa.

The operation of my improved power mechanism is extremely simple and is as follows: Assuming that the position of the linkage is substantially as shown in Fig. 1—viz., that the motors are operative at half-speed and at half-power and the vehicle is therefore standing at rest, and is thus maintained positively, and that the operator is ready to start forward—then the controller-lever 46 may be pushed forward until the maximum speed possible with half-power will have been reached. If he wishes to increase this power to the maximum capacity, he will turn the hand-wheel 55 for changing the position of the lever 46, so as to increase the power supplied to the motor to the limit. If now he wishes to ascend an upgrade and the efficiency of the motor is not sufficient for this purpose, he will shift the lever 46 slightly backward, whereby the speed ratio of the motors is changed and a differential movement of the speed-transmission device is obtained. If he wishes to come to a standstill on the grade, he moves the operating-lever 46 into its neutral position, when both motors will run at equal speeds, and the carriage will therefore be held stationary under power, this power of course being increased or decreased according to the incline of the grade and the tendency of the vehicle to roll downhill. If the operator wishes to go backward, he will move the operating-lever back of the neutral line, thus changing the speed ratio of the motors so as to give to the backward motor the predominance, and when once properly positioned for the proper speed the power may be adjusted as required.

Many changes may be made in the particular construction and organization of the several devices for carrying my invention into practice, and I wish it distinctly understood that I do not confine myself to the use of any particular motor or source of energy for driving said motors; neither do I deem it essential that the linkage shown in the drawings and herein described need be adhered to in connection with my improved power mechanism, as many modifications thereof may be made by those skilled in the art without departing from the gist of my invention.

Having described my invention, what I claim as new, and desire to secure by Letters Patent, is—

1. The combination, with a pair of motors, movable in opposite directions and having valves for varying their efficiency; of a differential-power-transmission device comprising a rotatory member controlled by the movements of said motors relative to each other; and means for shifting said valves and for varying the speed ratio of said motors relatively to each other.

2. The combination, with a pair of independently-operative motors movable in opposite directions and each having a speed-controlling valve; of a differential-power-transmission device comprising a rotatory member controlled by the movements of said motors relative to each other; and means for shifting one of said valves and for varying the speed of one of said motors relative to that of the other.

3. The combination, with a pair of independently-operative motors, each having a speed-controlling device; of a differential-power-transmission device, comprising a rotatory member controlled by the movements of said motors relative to each other and an oscillatory member connected to both of said speed-controlling devices, and for varying the speed ratio of said motors relative to each other.

4. The combination, with a pair of independently-operative motors movable in opposite directions and having valves for varying their efficiency; of a differential-power-transmission device comprising a rotatory member controlled by the movements of said motors relative to each other; and a linkage comprising an oscillatory lever for shifting said valves and for varying the speed ratio of said motors relative to each other.

5. The combination, with a pair of independently-operative motors and speed-controlling device therefor; of a differential-power-transmission device, comprising a rotatory member controlled by the movements of said motors relative to each other; and a controller for varying the position of said speed-controlling devices relative to each other, and movable in two distinct zones disposed at opposite sides of a neutral line for shifting said speed-controlling devices.

6. The combination, with a pair of independently-operative motors and speed-controlling devices therefor; of a differential-power-transmission device, comprising a rotatory member controlled by the movements of said motors relative to each other; and a controller movable in a horizontal plane and in a forward and in a rearward direction from a neutral line for shifting said speed-controlling devices, and for causing an advancing and a retrograde movement, respectively, of said rotatory member.

7. The combination, with a pair of motors movable in opposite directions; of a differential-power-transmission device, comprising a rotatory member controlled by the movements of said motors relative to each other; and means for variably controlling the efficiency of both motors, simultaneously.

8. The combination, with a pair of motors movable in opposite directions; of a differential-power-transmission device, comprising a rotatory member controlled by the movements of said motors relative to each other; and a linkage comprising a member movable toward and away from said motors, and for variably controlling the efficiency of both motors, simultaneously.

9. The combination, with a pair of motors movable in opposite directions; of a differential-power-transmission device, comprising a rotatory member controlled by the movements of said motors relative to each other; and a linkage comprising a member movable toward and away from said motors, for variably controlling the efficiency of both motors simultaneously; and a device rotatable in opposite directions for operating said linkage.

10. The combination, with a pair of motors movable in opposite directions; of a differential-power-transmission device comprising a rotatory member controlled by the movements of said motors relative to each other; and a compound controller for varying the speed ratio, and also the efficiency, of said motors, simultaneously.

11. The combination, with a pair of motors movable in opposite directions; of a differential-power-transmission device, comprising a rotatory member controlled by the movements of said motors relative to each other; a controller, comprising a member for varying the speed ratio of said motors; and a device for variably controlling the efficiency of both motors, simultaneously, and operable independently of, but movable with, said speed-varying member.

12. The combination, with a pair of motors movable in opposite directions; of a differential-power-transmission device, comprising a rotatory member controlled by the movements of said motors relative to each other; a controller, comprising an oscillatory member movable on opposite sides of a neutral line for varying the speed ratio of said motors relative to each other; and a rotatable device for variably controlling the efficiency of both motors, simultaneously, and operable independently of, but movable with, said oscillatory member.

CHARLES W. SPONSEL.

Witnesses:
  CHAS. F. SCHMELZ,
  JULIA G. MCCORMICK.